United States Patent Office 3,826,776
Patented July 30, 1974

3,826,776
BLOCK COPOLYMERS AND OXIDIZED CARBON
BLACK COMPOSITIONS
Roy F. Wright, Bartlesville, Okla., assignor to
Phillips Petroleum Company
No Drawing. Filed June 28, 1971, Ser. No. 157,764
Int. Cl. C08c 11/18; C08f 19/08
U.S. Cl. 260—42.14                                    6 Claims

ABSTRACT OF THE DISCLOSURE

A process for, and high green strength rubbery compositions resulting from, compounding block copolymers with filler materials, comprising: admixing oxidized carbon black with thermoplastic elastomers selected from linear block copolymers and branched block copolymers wherein the copolymers have at least two resinous terminal polymer blocks and an elastomeric central block.

---

This invention relates to a process for compounding high green strength copolymers and oxidized carbon black. In another aspect, this invention relates to high green strength compositions comprised of block copolymers admixed with oxidized carbon black as filler material.

Compositions comprising thermoplastic elastomers are sometimes employed in an uncured condition because these compositions exhibit many properties of vulcanized elastomers at or near room temperature. These compositions can also be recycled as scrap in molding operations and the like. Both uncured and vulcanized compositions make use of filler materials in order to achieve specific physical properties and to lower the cost of the final product. One commonly used filler material in both vulcanized and uncured compositions is carbon black. But the type of carbon black used as filler must be distinguished since, for example, oxidized carbon black has been found to lower the physical strengths of vulcanized compositions as compared to the strengths of vulcanized compositions using non-oxidized carbon black. The art further directs away from using oxidized carbon blacks as filler materials in heat treated synthetic copolymers such as butadiene/styrene copolymers, for example, the process described in U.S. 3,178,387.

It has now been found that compounds of oxidized carbon black and block copolymers, with no curing required, produced products having unexpected increases in modulus and in tensile strength, as compared with branched block copolymers using normal or unoxidized carbon blacks. This discovery is of particular interest when the uncured, block copolymer-oxidized carbon black composition is compared with convention rubbers, requiring vulcanization, wherein oxidized blacks cause a decrease in modulus and in tensile strength.

It is an object of the present invention to provide an improved green strength block copolymer-filler composition. It is another object of the invention to provide a process for compounding rubbery block copolymers with oxidized carbon black fillers. It is a particular object of the invention to provide improved thermoplastic products having filler-green strength properties normally associated with vulcanized compositions. It is a further object of the invention to provide improved green strength compositions of thermoplastic elastomers comprising linear block copolymers and branched block copolymers, and oxidized carbon blacks. Other objects, advantages and features of the invention will become apparent to those skilled in the art from the following discussion.

Suitable carbon black which can be used as filler in the preparation of the compositions of my invention, is carbon black containing oxygen on its surface. Carbon black containing the aforementioned oxygen can be obtained in numerous ways. For example, the carbon black can be obtained with an oxygen-containing surface as a result of the mode of its preparation or by subsequent treatment. Thus, the so-called channel blacks which are known to have oxygen on their surface are useful. The so-called furnace blacks differentiated by the absence of any appreciable amounts of oxygen are substantially undesirable when employed in the composition of this invention due to their effective lowering of the compositions physical strength. The furnace black, as well as other carbon blacks having substantially no oxygen present, can be made completely satisfactory, however, by suitable treatment to produce an oxygen-containing surface thereby producing an oxidized carbon black. This may be done by a variety of known chemical methods. A common process is the treatment of unoxidized carbon black surfaces with oxygen, oxygen-containing gases such as air, or with an oxygen-producing substance such as the peroxides or ozone, nitrogen oxides, nitric acid, etc. These treatments of carbon black are well known in the art to produce oxidized carbon black.

Chemi-absorbed oxygen is generally believed to be combined on the surface of carbon black as, e.g., —CHO, —OH, —COOH, =C=O, etc., and is present thereon as the result of the manner in which the carbon black is prepared. These oxygen-containing moieties are responsible for surface pH which carbon blacks show. Thus, the higher the surface oxygen content, the lower the pH or the more acidic the surface as measured in a water slurry. A pH of less than 7 is preferred. It is well known that the removal of chemi-absorbed oxygen does not interfere with particle size or internal structure of the carbon black. When such oxygen is removed, however, the block copolymers and deoxygenated carbon mixtures have much lower tensile strengths than do mixtures of block copolymers and oxygen containing carbon black.

The oxidized carbon black preferably has a nitrogen surface area of about 85 to about 205 square meters per gram.

To prepare the composition and to carry out the process of my invention, block copolymers and carbon black of one of the types containing oxygen on its surface are admixed with the aforementioned carbon black constituting from about 5 to about 500 phr. (parts by weight per 100 parts by weight of rubber). The mixing of the block copolymers and the oxygenated carbon black can be achieved by conventional mechanical blending as in a Banbury mixer, or on a rubber mill.

Suitable block copolymers for the composition and process of my invention can be defined as thermoplastic elastomers selected from linear block copolymers and branched block copolymers wherein the copolymers have at least two resinous terminal polymer blocks and an elastomeric central block. The suitable block copolymers of my invention essentially define thermoplastic elastomers having high green strength characteristics.

One suitable block copolymer as defined hereinabove can be prepared by polymerizing monomers selected from the group consisting of conjugated dienes and vinyl-substituted aromatic compounds in the presence of an organomonolithium initiator and reacting the resulting monolithium-terminated polymer with a compound having at least three reactive sites capable of reacting with the carbon-lithium bond of the polymer thereby coupling said polymer with said compound. The result is a polymer having relatively long branches which radiate from a nucleus formed by the polyfunctional compound which reacts with the lithium-terminated polymer. For convenience, I will refer to these polymers as radical block copolymers. Particularly, the aforementioned prepared block copolymer as utilized in this invention is a teleblock of butadiene/styrene as illustrated in Table I below. Also, for the purpose of this invention, a teleblock is defined as a block polymer having terminal segments of polystyrene and an internal rubbery segment of a polymer of a conjugated diene.

Oxidized blacks are also shown to yield greater reinforcement than an unoxidized control black when admixed with block copolymers of the linear teleblock or lactone terpolymer variety. Lactone terpolymers are block copolymers wherein the macromolecules which make up the copolymer contain at least two segments joined in an end-to-end relationship, at least one segment being formed predominantly of a monomer or monomers from one of the two monomer classes, i.e., lactones or conjugated dienes and/or monovinyl-substituted aromatic compounds, and at least one other block, usually linear, being formed predominantly of at least one monomer from the plastic monomers not used to form the first mentioned block. Where the dissimilar monomers are denoted as A and B, a copolymer within the scope of the aforementioned can be represented structurally by substituting one or more lactones for the A and one or more conjugated dienes and/or monovinyl-substituted aromatic compounds for the B or vice versa.

Exemplary of the aforementioned would be the utilization of two dissimilar monomers A and B employed in making a block copolymer, and the resulting block copolymer containing two blocks. A macromolecule of this copolymer can be represented by the structure AAAABBBB. A block copolymer can be formed using at least one lactone as a monomer and at least one of conjugated diene compounds and monovinyl-substituted aromatic compounds as the other monomer, and employing lithium-based compounds as the initiator. For example, a block copolymer with a first block of a homopolymer styrene, a second block of a homopolymer of butadiene, and a third block of a polyester of epsilon-caprolactone prepared in a three-step method using a butyllithium catalyst is further illustrated in Table II as it applies in my invention.

Block styrene-butadiene-caprolactam terpolymers having high green strength which is attributable to their thermoplastic elastomeric composition are also found to be suitable as the block copolymer of my invention. The aforementioned terpolymers may be prepared by synthetization involving polymer lithium wherein modification of polymer lithium with the reaction product of p-chlorophenylisocyanate and the sodium salt of caprolactam is utilized prior to lactam polymerization. The aforementioned polymers are generally of the thermoplastic elastomer type, i.e., at or near room temperature said polymers usually have elastomeric behavior typical of vulcanized rubbers, but in an uncured condition at higher temperatures they become thermoplastic.

Suitable block copolymers defined as thermoplastic elastomers selected from linear block copolymers and branched block copolymers wherein the polymers have at least two resinous terminal polymer blocks and an elastomeric central block can be further defined by the process of their manufacturer. The aforementioned block copolymers having essentially high green strength characteristics can be selected from the thermoplastic elastomers comprising the group of a radial teleblock of butadiene/styrene, a butadiene/styrene/lactone polymer, and a butadiene/styrene linear teleblock polymer. The radial teleblock of butadiene/styrene results from reacting at least one first monomer selected from the group consisting of conjugated dienes having from 4 to 12 carbon atoms per molecule, inclusive, and monovinyl substituted aromatic compounds having from 8 to 12 carbon atoms per molecule, inclusive, and an effective catalytic amount of lithium-containing catalyst selected from the group consisting of a compound of the formula $R'(Li)_x$ wherein $R'$ is a hydrocarbon radical selected from the group consisting of aliphatic, cycloaliphatic, and aromatic radicals, $x$ is an integer of from 1 to 4, inclusive. The butadiene/styrene/lactone polymer results from reacting the aforementioned reaction product with at least one monomer selected from the group consisting of lactones represented by the formula:

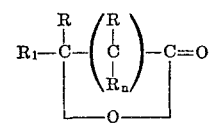

wherein $R_1$ is one of hydrogen and a radical of the formula

and when $R_1$ is the specified radical, no R is attached to the carbon atom to which the radical is attached, and wherein R is one of hydrogen, a saturated aliphatic, saturated cycloaliphatic, or an aromatic radical, or combination thereof, $n$ is an integer which can be 1, 3, or 4, and the total number of carbon atoms in the substituents employed, if any, is in the range of 1 to 12, inclusive.

A butadiene/styrene linear teleblock polymer results from reacting a polymer block R″Li wherein R″ is a polymer monovinyl substituted aromatic having from 8 to 12 carbon atoms per molecule, inclusive, with a second monomer selected from the group consisting of conjugated dienes having from 4 to 12 carbon atoms per molecule, inclusive, and after essentially complete polymerization of the diene, adding a third monomer to the polymerization reaction mixture comprising monovinyl substituted aromatic compounds having from 8 to 12 carbon atoms per molecule in the presence of an effective catalytic amount of lithium-containing catalyst.

Thermoplastic rubbers using carbon black as filler materials not only reduce the cost of the end compositions but also produce compositions with improved abrasion resistance for applications such as garden hose, tubing, toy wheels, floor mats, window gaskets, and the like. The comparative examples illustrate the advantage of utilizing oxidized carbon black with thermoplastic elastomers selected from the block copolymers as defined hereinabove. Table I hereinbelow illustrates the influence of nitric acid and air oxidation of carbon black on butadiene/styrene copolymers and natural rubber. As will be seen oxidation of the carbon black decreases reinforcement in natural rubber, but increases reinforcement in the butadiene/styrene block copolymers. Table II illustrates the effect of oxidized carbon blacks upon linear teleblock or lactone terpolymers resulting in greater reinforcement than with the unoxidized carbon black control. Table III illustrates again the advantage and greater reinforcement through the utilization of an oxidized carbon black than results from the unoxidized black. Further, it is illustrated in Table III that the vulcanized materials are reinforced to a greater extent with the unoxidized carbon black of similar particle size than with the oxidized carbon black.

The following exemplary tables are presented to illustrate the process and the compositions resulting therefrom but are not intended to be specifically limiting upon the scope of the invention.

TABLE I.—COMPARISON OF OXIDIZED BLACKS IN RADIAL TELEBLOCKS OF BUTADIENE/STYRENE AND ASTM NATURAL RUBBER

| Parent black pelleting and drying variables | N326 [a] base run | Oxidized black | | |
|---|---|---|---|---|
| | | I | II | III |
| Max. drying temp., °F | 410 | 400 | 680 | 720 |
| Max. drying temp., held, min | 0 | 0 | 30 | 60 |
| $HNO_3$ added during pelleting, percent | | 5.5 | | |
| $N_2SA$, m²/g. (after drying) | 85 | 85 | 113 | 205 |
| DBP structure, cc./100 gm | 70 | 70 | 70 | 70 |

Thermoplastic Elastomer Recipe [b]

| 300% modulus, p.s.i | 1,350 | 1,350 | 1,420 | 1,560 |
|---|---|---|---|---|
| Tensile, p.s.i | 2,280 | 2,340 | 2,870 | 2,860 |
| Elongation, percent | 490 | 490 | 580 | 750 |

ASTM-NR Recipe [b]

| 300% modulus, p.s.i | 1,630 | 1,280 | 970 | 970 |
|---|---|---|---|---|
| Tensile, p.s.i | 4,240 | 3,150 | 3,800 | 3,350 |
| Elongation, percent | 570 | 520 | 640 | 600 |

[a] N326 is an ASTM designation.
[b] Recipe contains Solprene 406 radial block copolymer and 40 phr. carbon black. Mixing was in a Plasti-Corder. Test specimens were molded 10 minutes at 320° F. Solprene 406 is a radial teleblock of butadiene/styrene, 60/40 overall composition.
[c] Recipe contains Liberian crepe, 5 phr. zinc oxide, 3 phr. stearic acid, 2.5 phr. sulfur, 0.6 phr. 2,2'-dibenzothiazyl disulfide, and 50 phr. black. Mixed on roll mill. Cured 30 minutes at 293° F.

TABLE II.—LINEAR AND LACTONE TERPOLYMER WITH OXIDIZED BLACK

| Parent black pelleting and drying variables | N326 [a] base run | Oxidized black | |
|---|---|---|---|
| | | I | II |
| Max. temp., °F | 410 | 720 | 720 |
| Max. temp., held, min | 0 | 30 | 60 |
| $N_2SA$, m²/g. (after drying) | 85 | 166 | 205 |
| DBP, cc./100 gm | 70 | 70 | 70 |

Linear Recipe [b]

| 300% modulus, p.s.i | 920 | 1,050 | 1,070 |
|---|---|---|---|
| Tensile, p.s.i | 3,160 | 3,250 | 3,240 |
| Elongation, percent | 725 | 690 | 715 |

Lactone Terpolymer Recipe [c]

| 300% modulus, p.s.i | 1,550 | | 1,600 |
|---|---|---|---|
| Tensile, p.s.i | 1,930 | | 2,070 |
| Elongation, percent | 460 | | 480 |

[a] N326, an ASTM designation.
[b] Kraton 1101 with 40 phr. black. Mixed in a Plasti-Corder. Test specimens molded 10 minutes at 320° F. Kraton 1101 is a linear teleblock of styrene/butadiene/styrene of 72/28 butadiene/styrene overall composition produced by Shell.
[c] Lactone polymer with 40 phr. carbon black. Mixed and molded the same as Kraton 1101. The lactone polymer used was styrene/butadiene/ε-caprolactone, 25/50/25.

TABLE III.—OXIDIZED vs. NORMAL CURING BLACKS IN RAW vs. VULCANIZED SOLPRENE 406

| | Base run | I |
|---|---|---|
| Black type | N326 [a] | S315 [a] |
| $N_2SA$, m²/g | 86 | 88 |
| Approximate acid, percent | 0 | 3 |

Thermoplastic Elastomer—Raw [b]

| 300% modulus, p.s.i | 1,170 | 1,330 |
|---|---|---|
| Tensile, p.s.i | 2,530 | 2,700 |
| Elongation, percent | 700 | 770 |

Thermoplastic Elastomer—Vulcanized [c]

| 300% modulus, p.s.i | 2,550 | 2,510 |
|---|---|---|
| Tensile, p.s.i | 3,170 | 3,110 |
| Elongation, percent | 410 | 410 |

[a] N326, an ASTM designation. S315, an ASTM designation.
[b] Recipe contains Solprene 406 radial block copolymer, 40 phr. black, 5 phr. zinc oxide, 3 phr. stearic acid, and 3 phr. Philrich 5. Mixing was in a BR Banbury. Test specimens were molded 10 minutes at 310° F.
[c] Recipe contains Solprene 406 radial black copolymer, 40 phr. black, 5 phr. zinc oxide, 3 phr. stearic acid, 3 phr. Philrich 5 a heavy extract oil, 1.5 phr. sulfur, 1.0 phr. N-cyclohexyl-2-benzothiazolesulfenamide. Mixing was in a BR Banbury except sulfur and N-cyclohexyl-2-benzothiazolesulfenamide added on roll mill after initial mix. Test specimens were cured 20 minutes at 307° F.

It will be seen by the above tables that the block copolymers utilizing oxidized carbon black filler material results in substantially improved rubber blend compositions.

What I claim is:

1. An unvulcanized, elastomeric, thermoplastic block polymer-filler composition having high green strength comprising per 100 parts of polymer: from about 5 to about 500 phr. oxidized carbon black containing oxygen on its surface selected from the group consisting of channel blacks and furnace blacks that have been treated to produce an oxygen-containing surface with a pH of less than 7 and, as the thermoplastic elastomer, a radial teleblock copolymer of butadiene and styrene.

2. A composition in accordance with claim 1 wherein the copolymer comprises 60 weight percent butadiene and 40 weight percent styrene.

3. A composition in accordance with claim 1 wherein the copolymer comprises 60 weight percent butadiene and 40 weight percent styrene, and said copolymer contains 40 phr. oxidized carbon black.

4. A composition according to claim 1 wherein said oxidized carbon black has a nitrogen surface area square meters per gram of from about 85 to about 205.

5. A composition according to claim 11 wherein said oxidized carbon black is an oxidized furnace black.

6. A composition according to claim 5 wherein said furnace black is oxidized by treatment with air.

References Cited

UNITED STATES PATENTS

| 3,585,257 | 6/1971 | Mueller et al. | 260—880 B |
| 3,306,761 | 2/1967 | Johnson | 423—460 |
| 3,523,812 | 8/1970 | Kraus | 423—460 |
| 3,265,765 | 8/1966 | Holden et al. | 260—876 B |

OTHER REFERENCES

Kraus: Reinforcement of Elastomers (Interscience) (N.Y.) (1965), pp. 130, 324–325, 358–359.

Kraus: Reinforcement of Elastomers (Interscience) (N.Y.) (1965), pp. 360–361.

LEWIS T. JACOBS, Primary Examiner

H. H. FLETCHER, Assistant Examiner

U.S. Cl. X.R.

106—307; 260—879, 880 B; 423—460; 260—42.47